(12) United States Patent
Kremmer et al.

(10) Patent No.: US 11,707,983 B2
(45) Date of Patent: Jul. 25, 2023

(54) SENSING TRACK CHARACTERISTICS ON A TRACK VEHICLE USING REPLACEABLE TRACK SENSORS

(71) Applicant: Deere & Company, Moline, IL (US)

(72) Inventors: Martin Kremmer, Bettendorf, IA (US); Carroll C. Kellum, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 433 days.

(21) Appl. No.: 16/776,771

(22) Filed: Jan. 30, 2020

(65) Prior Publication Data

US 2021/0237570 A1 Aug. 5, 2021

(51) Int. Cl.
| | |
|---|---|
| *B60K 31/00* | (2006.01) |
| *H04W 4/80* | (2018.01) |
| *B62D 55/24* | (2006.01) |
| *G01P 1/02* | (2006.01) |
| *B62D 55/06* | (2006.01) |
| *B60C 23/04* | (2006.01) |

(52) U.S. Cl.
CPC .......... *B60K 31/00* (2013.01); *B60C 23/0491* (2013.01); *B62D 55/06* (2013.01); *B62D 55/24* (2013.01); *G01P 1/02* (2013.01); *H04W 4/80* (2018.02); *B60K 2031/0091* (2013.01); *B60W 2422/70* (2013.01)

(58) Field of Classification Search
CPC .. B60C 23/0491; B62D 55/24; B62D 55/244; B62D 55/08; G01P 1/02; B60W 2422/70
See application file for complete search history.

(56) References Cited

U.S. PATENT DOCUMENTS

| | | |
|---|---|---|
| 5,587,698 A | 12/1996 | Genna |
| 6,098,682 A | 8/2000 | Kis |
| 6,371,214 B1 | 4/2002 | Anwar |
| 6,845,311 B1 | 1/2005 | Stratton |
| 7,043,973 B2 | 5/2006 | Shepherd et al. |
| 7,066,226 B1 | 6/2006 | Fiore |
| 7,591,628 B2 | 9/2009 | Noonan et al. |
| 8,087,216 B2 | 1/2012 | Noonan et al. |
| 8,985,250 B1 | 3/2015 | Lussier et al. |
| 9,033,431 B1 | 5/2015 | Zuchoski et al. |
| 9,228,875 B2 | 1/2016 | Lingle et al. |
| 9,868,482 B2 | 1/2018 | Rust et al. |
| 9,956,907 B2 | 5/2018 | Vandendriessche |

(Continued)

FOREIGN PATENT DOCUMENTS

| | | |
|---|---|---|
| DE | 10010811 A1 | 2/2001 |
| DE | 10017358 A1 | 10/2001 |

(Continued)

OTHER PUBLICATIONS

U.S. Appl. No. 16/122,275, filed Sep. 5, 2018 Application and Drawings, 44 pages.

(Continued)

*Primary Examiner* — James M McPherson
*Assistant Examiner* — Kyle J Kingsland
(74) *Attorney, Agent, or Firm* — Joseph R. Kelly; Kelly, Holt & Christensen PLLC

(57) ABSTRACT

A track for a track vehicle has sensor-receiving cavities disposed therein. Removeable sensors are placed in the sensor-receiving cavities for sensing characteristics of the track during operation.

10 Claims, 15 Drawing Sheets

(56) References Cited

U.S. PATENT DOCUMENTS

| | | |
|---|---|---|
| 9,989,976 B2 | 6/2018 | Garvin et al. |
| 10,124,844 B2 | 11/2018 | Brinkley et al. |
| 10,276,015 B2 | 4/2019 | Lang et al. |
| 10,464,419 B2 | 11/2019 | Vik et al. |
| 10,783,723 B2 | 9/2020 | Richard et al. |
| 11,131,076 B2 | 9/2021 | Cherney et al. |
| 2003/0093207 A1 | 5/2003 | Pallot |
| 2006/0259225 A1 | 11/2006 | Ono |
| 2008/0125947 A1 | 5/2008 | Hattori |
| 2008/0208416 A1 | 8/2008 | Yuet et al. |
| 2009/0182471 A1 | 7/2009 | Bucher |
| 2010/0271191 A1 | 10/2010 | de Graff |
| 2013/0298728 A1 | 11/2013 | Gartenmaier |
| 2014/0116808 A1* | 5/2014 | Kile ............... B62D 55/092 184/108 |
| 2014/0236431 A1 | 8/2014 | Hendrickson |
| 2014/0318236 A1* | 10/2014 | Lingle ............... G01F 23/26 73/290 R |
| 2014/0320278 A1* | 10/2014 | Upchurch ............ G01F 23/802 340/450 |
| 2014/0372006 A1 | 12/2014 | Hammerschmidt |
| 2015/0081166 A1 | 3/2015 | Diekevers et al. |
| 2015/0217817 A1* | 8/2015 | Delisle ............... B62D 55/26 305/180 |
| 2016/0114634 A1 | 4/2016 | Lubben |
| 2016/0221618 A1 | 8/2016 | Sidles |
| 2016/0281335 A1 | 9/2016 | Benzal et al. |
| 2017/0087987 A1 | 3/2017 | Vik et al. |
| 2017/0287303 A1 | 10/2017 | Lang et al. |
| 2018/0014467 A1 | 1/2018 | Lang et al. |
| 2018/0093724 A1 | 4/2018 | Boily |
| 2018/0190045 A1 | 7/2018 | Richard |
| 2018/0265145 A1 | 9/2018 | Todd et al. |
| 2019/0233030 A1 | 8/2019 | Stefano |
| 2020/0071908 A1 | 3/2020 | Cherney et al. |
| 2021/0173399 A1 | 6/2021 | Richard |
| 2021/0209869 A1 | 7/2021 | Kremmer |
| 2021/0237570 A1 | 8/2021 | Kremmer |

FOREIGN PATENT DOCUMENTS

| | | |
|---|---|---|
| DE | 102011052808 A1 | 1/2013 |
| DE | 202013101202 A1 | 3/2013 |
| DE | 102013018510 A1 | 5/2014 |
| DE | 112014005213 A1 | 8/2016 |
| EP | 3812249 A1 | 4/2021 |
| WO | 2017049393 A1 | 3/2017 |
| WO | 2019109191 A1 | 6/2019 |

OTHER PUBLICATIONS

U.S. Appl. No. 16/735,121 Office Action dated Aug. 26, 2022.
RFID Temperature Sensor Tags, Retrieved on Oct. 22. 2021, 16 pages.
German Search Report issued in Application No. DE102020214696.9, dated Jul. 30, 2021, 12 pages.
U.S. Appl. No. 16/735,121 Application and Drawings, filed Jan. 6, 2020, 40 pages.
U.S. Appl. No. 16/735,121 Office Action dated Oct. 5, 2021, 31 pages.
U.S. Appl. No. 16/735,121 Final Office Action dated Dec. 21, 2021, 36 pages.
German Search Report issued to counterpart application No. 102019213240.5 dated Jan. 21, 2020 (14 pages).
U.S. Appl. No. 17/461,171 Application and Drawings filed Aug. 30, 2021, 48 pages.
U.S. Appl. No. 16/735,121 Final Office Action dated Dec. 15, 2022, 61 pages.
U.S. Appl. No. 17/461,171 Non Final Office Action dated Mar. 17, 2023, 12 pages.
U.S. Appl. No. 16/735,121 Non Final Office Action dated Apr. 7, 2023, 50 pages.

* cited by examiner

US 11,707,983 B2

SENSING TRACK CHARACTERISTICS ON A TRACK VEHICLE USING REPLACEABLE TRACK SENSORS

FIELD OF THE DESCRIPTION

The present description relates to tracks that are used on track vehicles. More specifically, the present description relates to sensing track characteristics using replaceable sensors on tracks of track vehicles.

BACKGROUND

There are a wide variety of different types of mobile machines. Such mobile machines include, for instance, agricultural machines, forestry machines, construction machines and turf management machines. Many of these machines are propelled by a propulsion system (such as an engine) that drives ground-engaging elements, such as rubber tracks, through a transmission. Other machines have separate drive motors for each track or for different sets of tacks.

The tracks improve handling in difficult terrain, reduce contact pressure between the machine and the ground, and increase the coefficient of traction of such vehicles. The tracks are often formed as a belt, with lugs either integrally formed with the belt, or fastened to the belt. The inside of the belt is driven by a drive roller, and is mounted for rotation about the drive roller and at least one idler roller.

During some operating conditions, the temperature of the tracks can increase undesirably. This can cause irreversible damage to the tracks. Therefore, it is not uncommon for manufactures of vehicles or tracks to impose speed restrictions in order to avoid overheating portions of the tracks.

The discussion above is merely provided for general background information and is not intended to be used as an aid in determining the scope of the claimed subject matter.

SUMMARY

A track for a track vehicle has sensor-receiving cavities disposed therein. Removeable sensors are placed in the sensor-receiving cavities for sensing characteristics of the track during operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
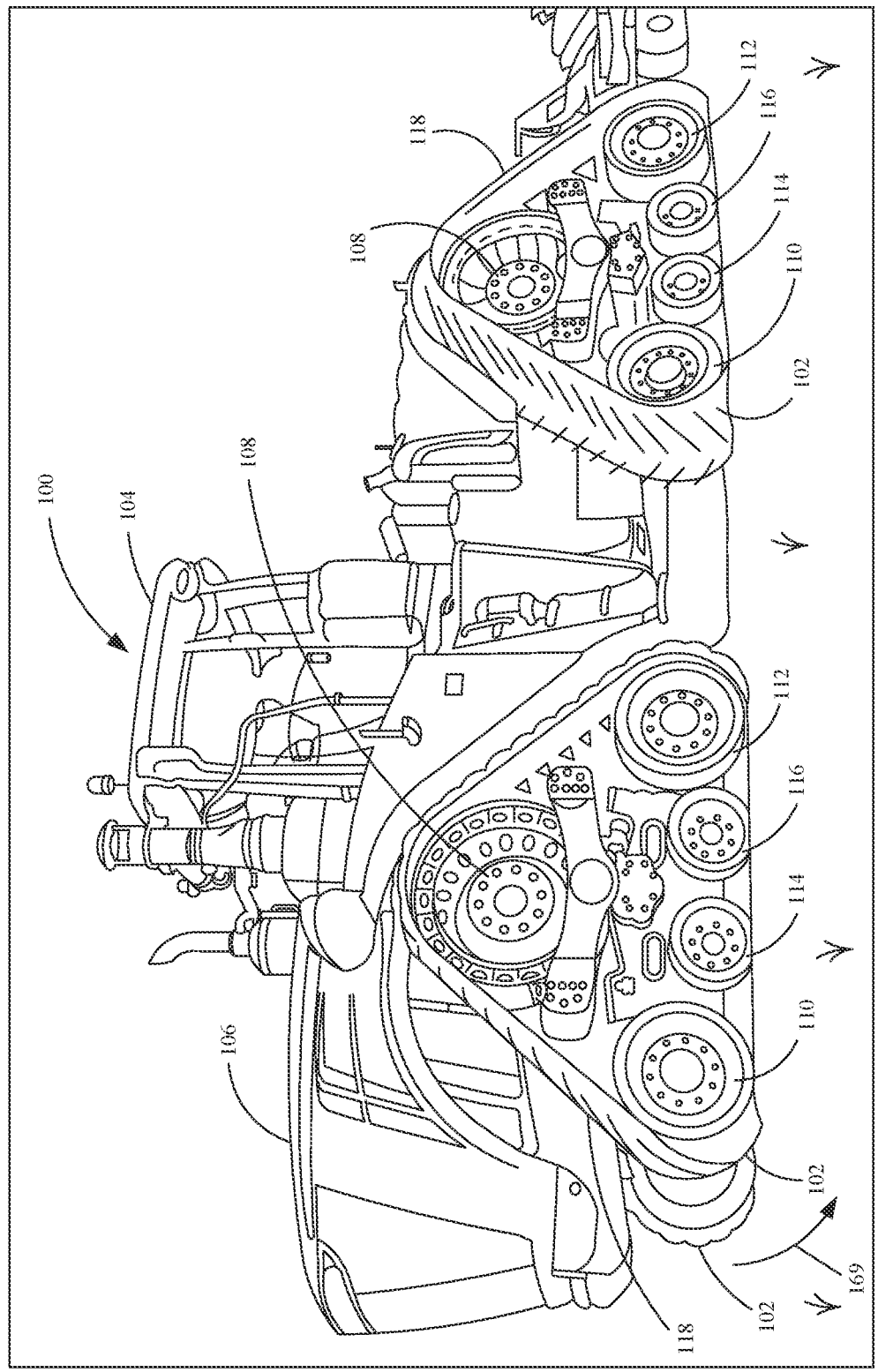
FIG. 1A is a pictorial illustration of a tractor that has a set of ground-engaging track subsystems.

FIG. 1A shows one example of a track vehicle (such as a tractor 100) with a set of ground-engaging track subsystems 102. In the example shown in FIG. 1A, tractor 100 illustratively has an operator compartment 104 and an engine compartment 106. An engine in engine compartment 106 illustratively drives rotation of track subsystems 102 through a transmission. In another example, each track subsystem 102 can have its own drive motor. In yet another example, sets of track subsystems 102 can share the same drive motor. For instance, the two track subsystems on one side of the tractor can be driven by one motor while the other two track subsystems can be driven by another motor. All of these, and other, configurations are contemplated herein.

In the example shown in FIG. 1A, each track subsystem 102 has a drive roller 108, a set of idler rollers 110 and 112, and a set of mid rollers 114 and 116. The rollers are illustratively rotate about (or along with) a separate axle that is mounted to a frame of tractor 100. The engine in engine compartment 106 illustratively generates power (e.g., hydraulic power, power to a transmission, etc.) that drives the drive rollers 108 which, in turn, drive tracks 118 to propel tractor 100.

In the example shown in FIG. 1A, it can be seen that idler rollers 110 and 112 are load bearing rollers which hold track 118 against the surface over which tractor 100 is traveling (e.g., against the ground). In some examples, mid rollers 114 and 116 can also be load bearing rollers. In other examples, mid rollers 114 and 116 are somewhat retracted vertically relative to idler rollers 110 and 112, so that they do not bear as much load as idler rollers 110 and 112.

Figure 1B:
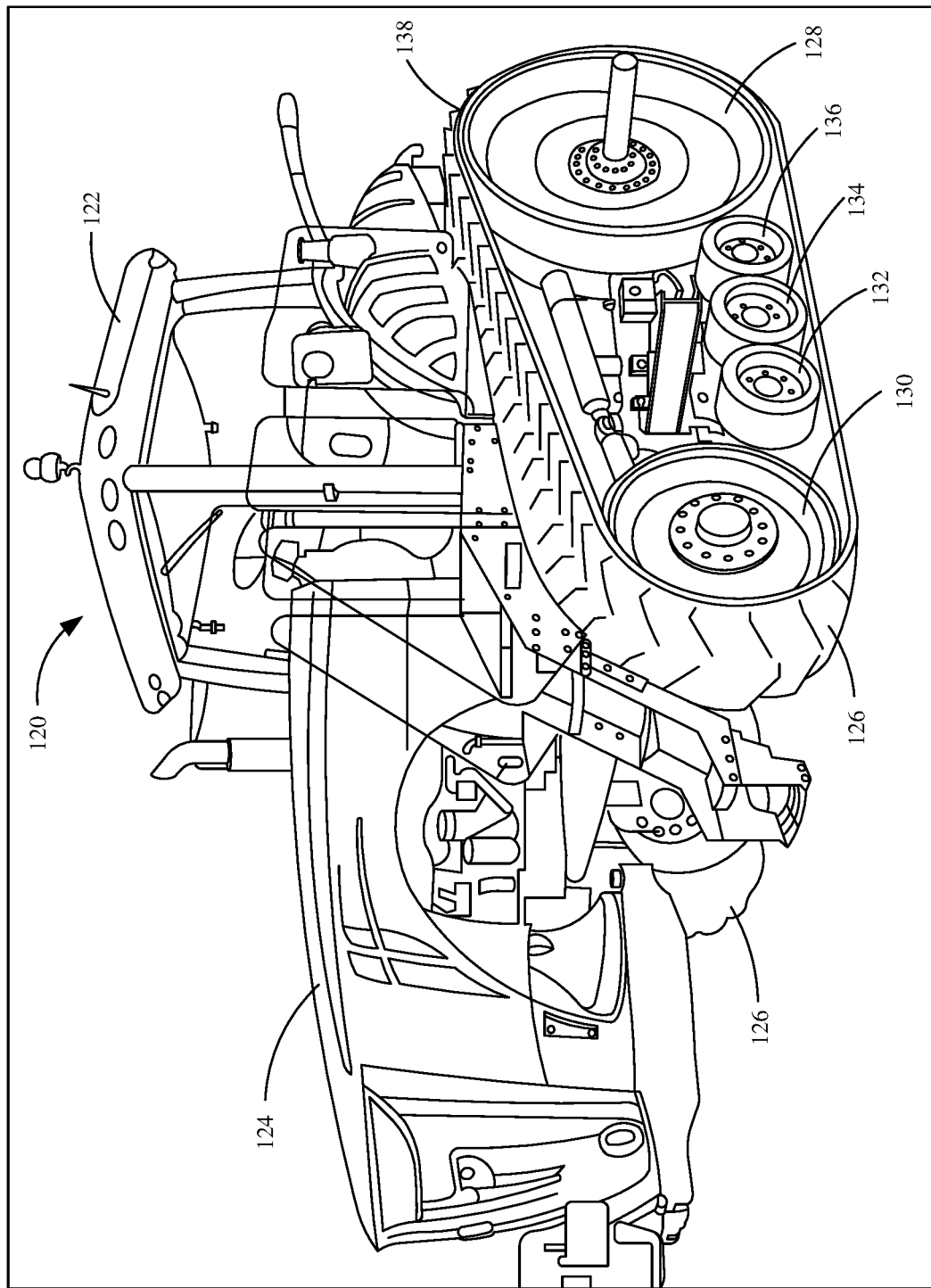
FIG. 1B is a pictorial illustration of a different tractor having a different set of ground-engaging track subsystems.

FIG. 1B is another example of a track vehicle, such as tractor 120. Tractor 120 illustratively has an operator compartment 122 and an engine compartment 124, as well as a set of track subsystems 126. In the example shown in FIG. 1B, track subsystem 126 has a drive wheel (or drive roller) 128 and an idler roller 130, as well as a set of mid rollers 132, 134 and 136. Track (or continuous belt) 138 is driven by drive roller 128, and it is supported for rotation by rollers 130-136. It can also be seen that rollers 128 and 130 are load bearing rollers in that they bear against track 138 in opposition to the surface over which tractor 120 is traveling. Also, in some examples, mid rollers 132, 134 and 136 may be weight bearing rollers as well. In other examples, they are vertically retracted upwardly relative to rollers 128 and 130, so that they bear less weight.

As discussed above, tracks 118 can overheat in certain circumstances or under certain conditions. Overheating can occur for a number of different reasons. One reason is the repeated flexure of the track as it is intermittently loaded and unloaded during rotation. Heat generation can depend on the amount of pressure being repeatedly applied and removed and the speed at which it is repeatedly applied and removed. For instance, as track 118 rotates about roller 110 in the direction indicated by arrow 169, the lugs 138 transition from a region above and forward of roller 110, where they are not bearing any of the tractor's weight (they are unloaded), into an area immediately below roller 110, where they are bearing the weight of the tractor against the track and the surface over which it is traveling (where they are loaded). The transition of each lug between the unloaded position (where it is not bearing the weight of the tractor), and the loaded position (where it is supporting the weight of the tractor) causes repeated flexing and compression of track 118, at the position of the lugs. The amount of flexing is based on the amount of pressure repeatedly applied to, and removed from the track. The amount of heat generated is also based on the speed at which the flexing occurs (e.g., the travel speed of the track). The pressure along the track is determined by the weight being supported by the track, and by the surface area over which the weight is distributed. As the pressure on any given area of the track increases (such as at the position of the lugs), the track flexes at those point(s). The greater the pressure, the more the flexure. The heat generation during flexing increases the internal temperature of the track. The temperature at which the rubber begins to become irreversibly damaged is often below 200° C.

Thus, in order to avoid damage leading to failure, track and vehicle manufacturers often provide guidelines to operators regarding weights and travel speeds. Under these guidelines, as the weight supported by the track increases, the suggested travel speed decreases.

Even despite the speed restrictions and load restrictions, operators can still experience track failures due to the uneven distribution of load on a segment on the track. For instance, the supporting ground surface below the track is a parameter that is difficult to control, due to various traffic conditions. One example is where an operator is driving the tractor on a roadway, but where one half of the track (or more) hangs over the edge of the pavement and thus supports very little weight. In this scenario, the pressure across one area of the track decreases significantly, but the pressure across another area of the track increase significantly. As the pressure increases, the heat generation also increases.

One difficulty that is encountered in attempting to measure the belt temperature is that, during operation, the track is continuously moving at a relatively high velocity. In addition, temperature development may occur on a very localized basis on the track.

Therefore, some current systems have manufactured tracks with sensors integrated into the track during the molding of the tracks. However, this type of system has several drawbacks. In some such systems, the tracks, themselves, are relatively expensive while the sensors are relatively inexpensive. Therefore, when a sensor, that is molded into the track itself, becomes defective for any reason, then, in order to address the defective sensor, the entire track must be replaced. Alternatively, if the track is not replaced, then the operation of the system is compromised, because of the defective sensor.

The present discussion thus proceeds with respect to a system in which a track is configured to receive replaceable sensors. The track is first manufactured (e.g., molded or otherwise manufactured), and it is configured with sensor-receiving cavities. The sensor-receiving cavities can be molded into the track, during manufacturing, or they can be generated after manufacturing. For instance, after the track is manufactured, the sensor-receiving cavities can be generated by a milling operation, or a drilling operation, or another type of operation.

In one example, the sensor-receiving cavities are sized to receive a sensor that can sense track characteristics of interest. The sensor can have a sensor body that is sized to frictionally engage the walls of the sensor-receiving cavity so that the sensor is frictionally fit within the sensor-receiving cavity. In another example, the sensor is placed in the sensor-receiving cavity, through an opening, which is subsequently sealed using a plug or other closing mechanism.

In yet another example, a sensor-receiving element is first inserted into the sensor-receiving cavity or inserted during the manufacturing process (such as molded into the sensor-receiving cavity during manufacturing). The sensor-receiving element may be separate from, but attached to the track and sized to receive the sensor therein, so that the sensor is securely, but replaceably, fit within the sensor-receiving element. Therefore, the sensor can be press fit or frictionally fit into the sensor-receiving element. In another example, the sensor-receiving element may be configured with a cap or other closure so that it can be opened, the sensor can be inserted, and the sensor-receiving element can again be closed using the closure mechanism. The closure mechanism may be removeable so that the sensor can be replaced.

Figure 2:
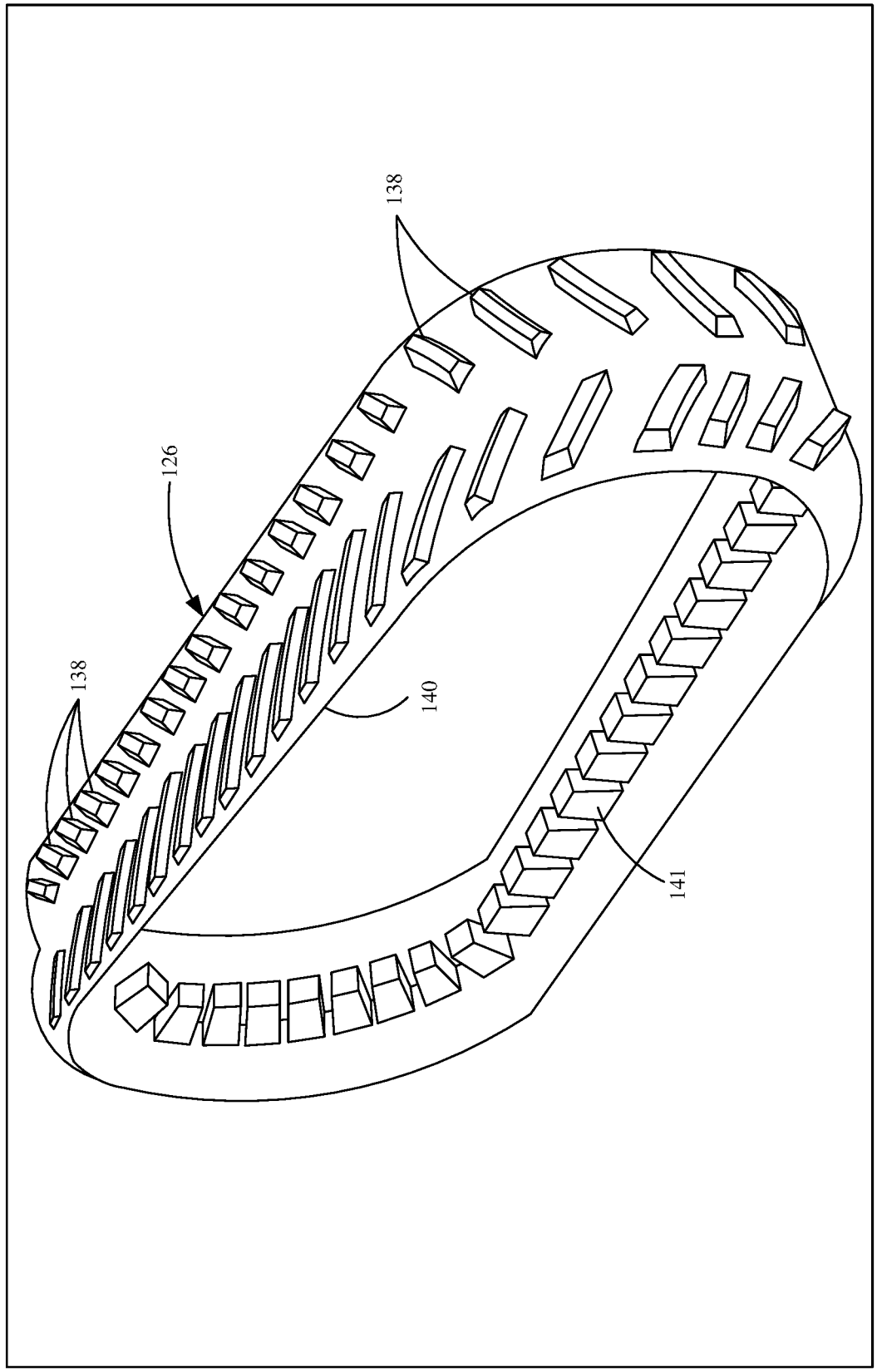
FIG. 2 is a pictorial illustration of a track.

FIG. 2 is a pictorial illustration of one example of a track, such as track 126, that can be used on a track vehicle such as track vehicle (e.g., tractor) 120, shown in FIG. 1B. As illustrated in FIG. 1B, track 126 has lugs 138 disposed on an exterior surface of a belt 140. In one example, the lugs 138 are molded onto the belt, during manufacturing of track 126.

FIG. 2 also shows that belt 126 has a feature, such as a plurality of inwardly directed teeth 141. The drive wheel has corresponding notches that engage the inwardly directed teeth 141 to drive track 126, rotatably, about the drive wheel and any idler rollers, as well as about any mid rollers.

Figure 3:
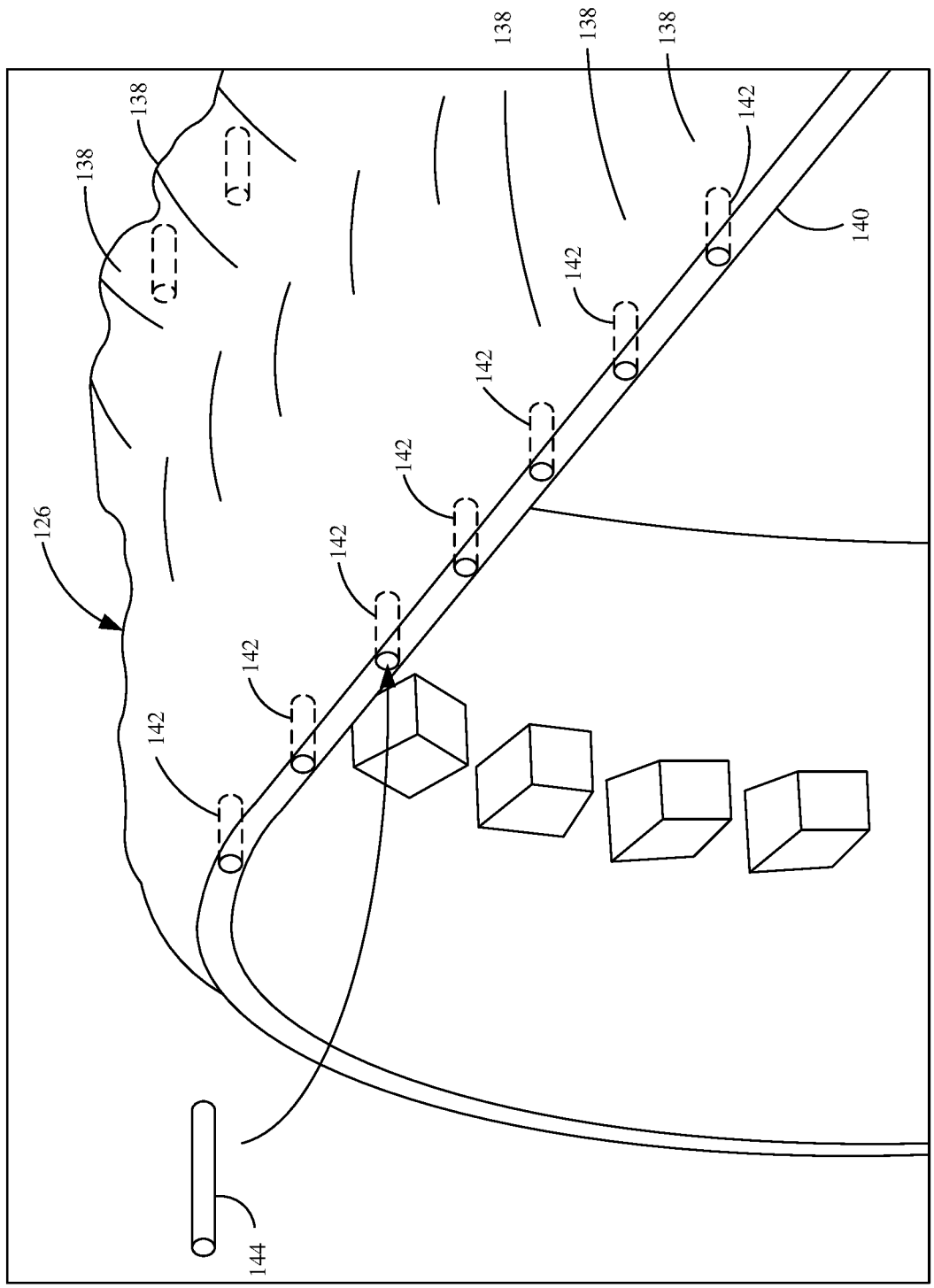
FIG. 3 is an enlarged partial pictorial, partial schematic illustration of the track shown in FIG. 2, with sensor cavities and sensors.

FIG. 3 is an enlarged view of a portion of track 126, shown in FIG. 2. FIG. 3 specifically shows that a plurality of sensor-receiving cavities 142 are formed in track 126. In the example shown in FIG. 3, the sensor-receiving cavities 142 are formed in, or closely proximate, the lugs 138. Also, in the example shown in FIG. 3, the sensor-receiving cavities 142 are sized to receive a sensor 144. Sensor 144, as is described in greater detail below, can be any of a wide variety of different kinds of sensors and illustratively senses characteristics of interest of track 126, such as temperature, pressure, velocity, acceleration, or a wide variety of other characteristics.

FIG. 3 shows that sensor 144 is generally cylindrical in shape, but it can be a wide variety of other shapes as well. The sensor-receiving cavities 142 are shaped to receive sensor 144. In one example, the sensor-receiving cavities 142 are sized and shaped so that the external surface of sensor 144 engages the internal surface of a corresponding cavity 142. The cavities 142 can thus be sized to frictionally engage the outer surface of sensors 144 sufficiently so that sensors 144 stay in place during operation of the track vehicle on which track 126 is mounted. In another example, after sensors 144 are inserted into sensor-receiving cavities 142, a plug or other closure mechanism is inserted into an opening in the sensor-receiving cavity 142 to close them. However, the plug or other closure mechanism is illustratively removeable so that sensors 144 can be removed from cavities 142 and replaced, as needed or desired.

It will be noted that the sensor-receiving cavities 142 can be molded into track 126, or otherwise created in track 126 during the manufacturing of track 126. In another example, the sensor-receiving cavities 142 are created in track 126 after it is manufactured. This can be done using a milling process, using a drilling operation, or in a wide variety of other ways.

Figure 4:
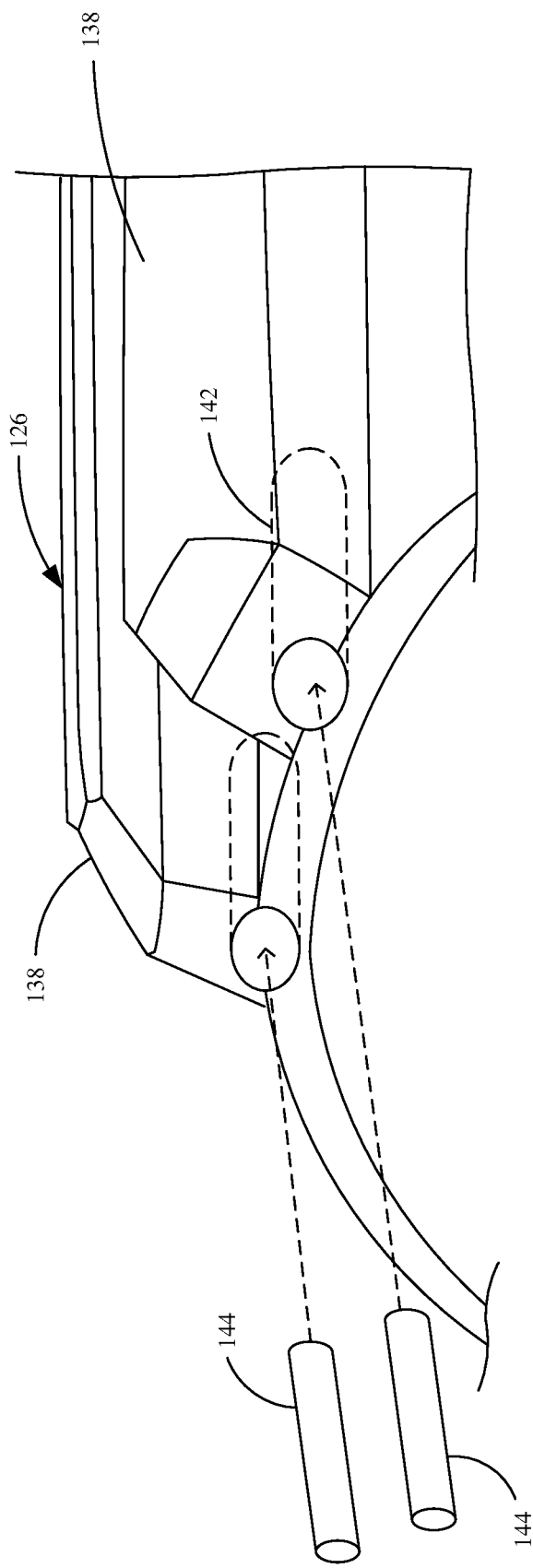
FIG. 4 is an enlarged view of a portion of the track shown in FIGS. 2 and 3, illustrating sensor cavities and sensors.

FIG. 4 is a more enlarged view of a portion of track 126 showing lugs 138 and a pair of sensor-receiving cavities 142. Sensors 144 are assembled into cavities 142. FIG. 4 shows that, in one example, cavities 144 are formed generally within lugs 138, or in an interface region in which lugs 138 interface with the underlying belt 140 of track 126. These are examples only, and sensor-receiving cavities 142 can be formed in other parts of track 146 as well.

Figure 5:
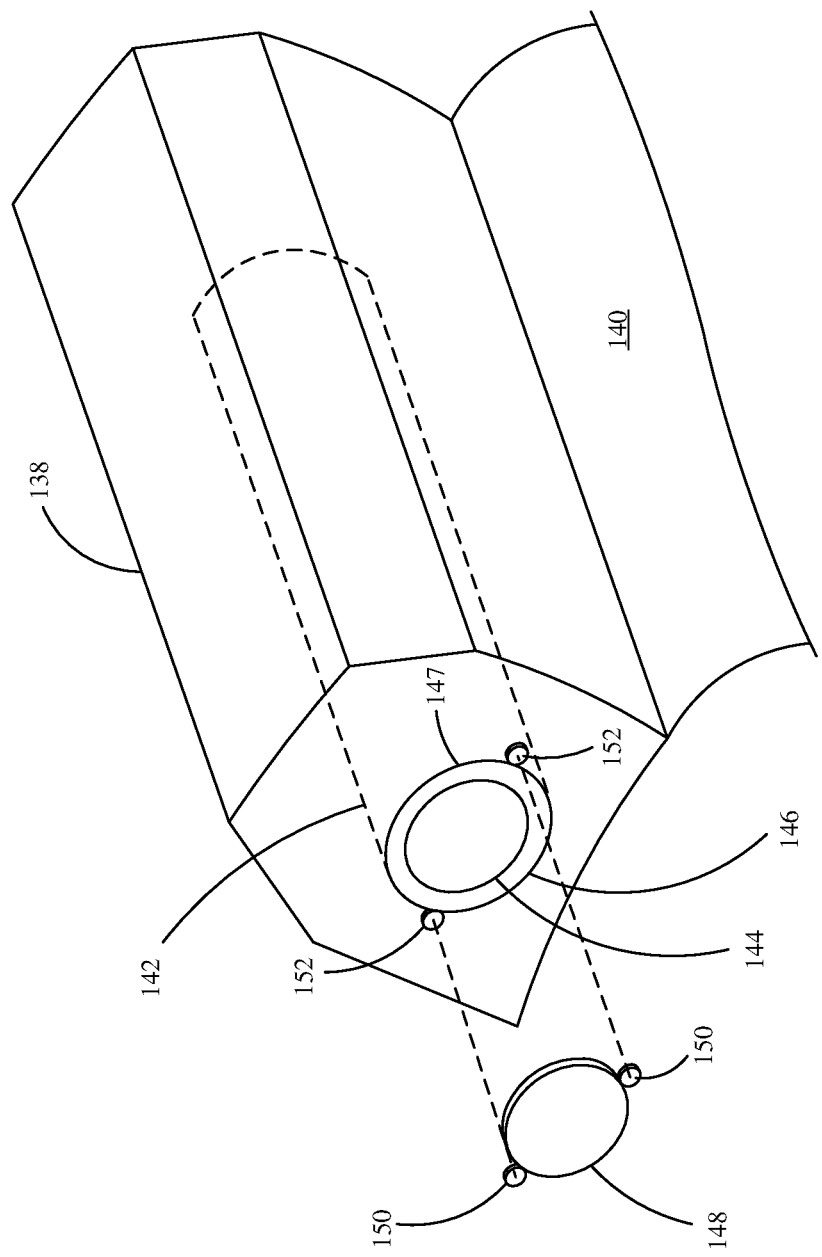
FIG. 5 is an enlarged view of a lug on a track, with a sensor-receiving element and a sensor disposed therein.

FIG. 5 is an enlarged view of a portion of track 126 showing a lug 138 with a sensor-receiving cavity 142 formed therein. In the example shown in FIG. 5, a sensor-receiving element 146 has been inserted into sensor-receiving cavity 142. Sensor-receiving element 146 is illustratively a tube with a closure mechanism 148 that can be releasably attached to the opening 147 in tube 146. The closure mechanism 148 can be secured to corresponding flanges 152 on tube 146. The flanges 150 and 152 can be secured to one another using any appropriate securing mechanism, such as screws, latches, adhesive, or any other securing elements. Also, in one example, the sensor-receiving tube 146 may be sized to frictionally engage the outer surface of sensor 144 so that no closure element 148 is needed. In another example, sensor 144 is press fit into sensor-receiving element (or tube) 146 and a closure element 148 is also provided to close the opening 147 in sensor-receiving element 146. These are examples only.

Figure 6:
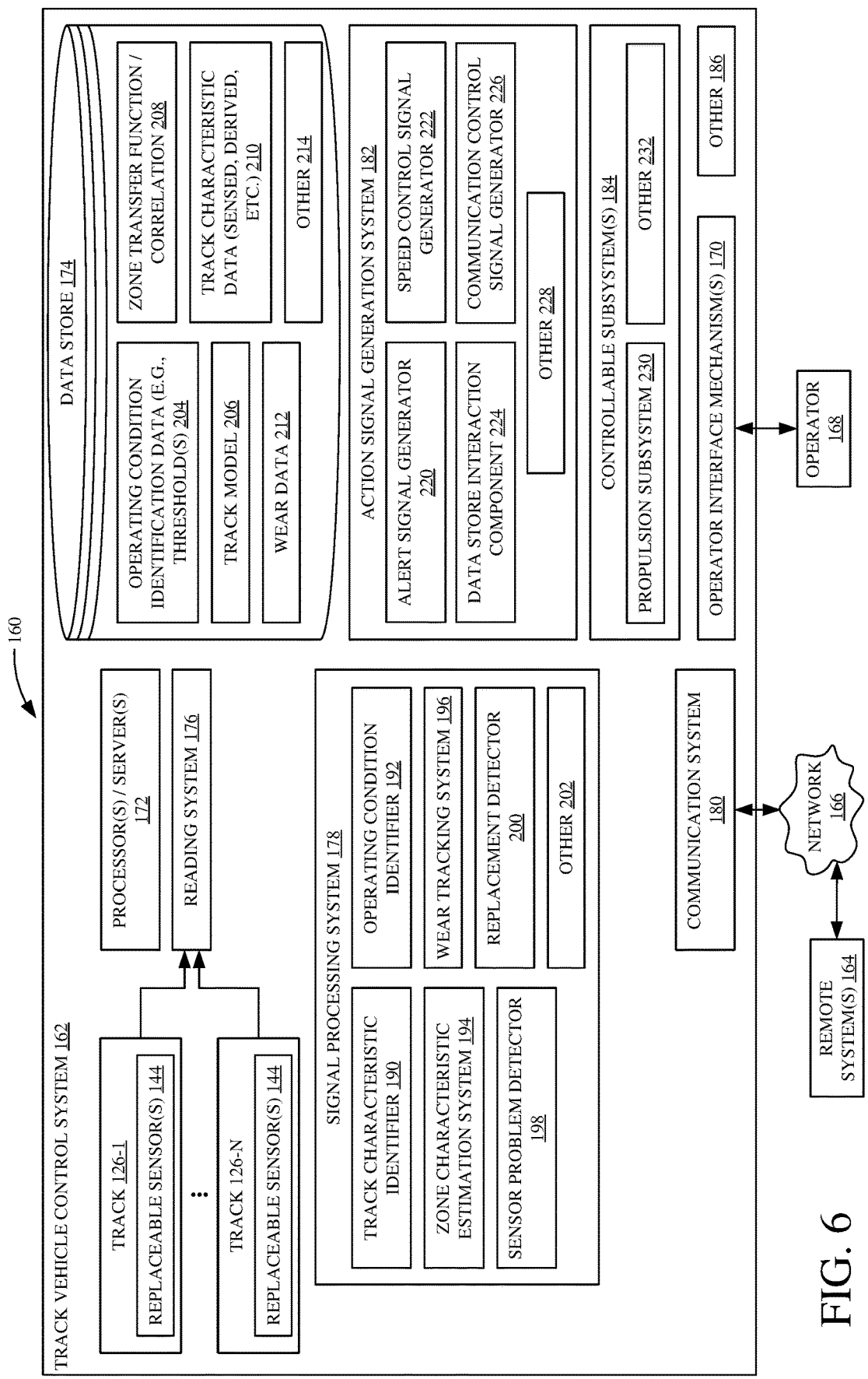
FIG. 6 is a block diagram showing one example of a track vehicle control system.

FIG. 6 is a block diagram of one example of a track vehicle control system architecture 160. Architecture 160 includes a track vehicle control system 162 that may be mounted to a track vehicle (such as tractor 120 shown in FIG. 1B, or a different track vehicle). Track vehicle control system 162 is shown communicatively coupled to one or more remote systems 164 over a network 166. Remote systems 164 can be a remote farm manager computing system, a vendor computing system, a manufacturer computing system, or any of a wide variety of other remote systems.

Network 166 can be a wide area network, a local area network, a near field communication network, a cellular communication network, or any of a wide variety of other networks or combinations of networks. Thus, in one example, track vehicle control system 162 can communicate with remote systems 164, by sending and receiving any of a wide variety of different types of data (some of which are described elsewhere) to remote systems 164 over network 166.

FIG. 6 also shows that operator 168 can interact with operator interface mechanisms 170 on track vehicle control system 162. Operator interface mechanisms 170 can be levers, linkages, joysticks, steering wheels, pedals, user actuatable display elements that can be actuated on a user interface display (such as icons, links, buttons, etc. that can be actuated using a point and click device), a touch sensitive screen that operator 168 can interact with using touch gestures, a microphone and speaker (where, for example, speech recognition functionality is provided) or any of a wide variety of other audio, visual and/or haptic mechanisms. Operator 168 illustratively interacts with operator interface mechanisms 170 in order to control and manipulate track vehicle 120, and parts of track vehicle control system 162.

Before describing the operation of architecture 160 in more detail, a brief description of some of the items in architecture 160 will first be provided. In the example shown in FIG. 6, track vehicle control system 162 illustratively includes a plurality of different tracks, labeled 126-1 through 126-N. Each track illustratively has a plurality of replaceable sensors 144 disposed in sensor-receiving cavities. Track vehicle control system 162 also includes one or more processors or servers 172, data store 174, reading system 176, signal processing system 178, communication system 180, action signal generation system 182, one or more controllable subsystems 184, and it can include a wide variety of other items 186. Communication system 180 illustratively enables some items of track vehicle control system 162 to communicate with one another, and to communicate with remote systems 164. Therefore, communication system 180 can be any of a wide variety of different types of communication systems, depending on the types of communications it is to enable.

Figure 7:
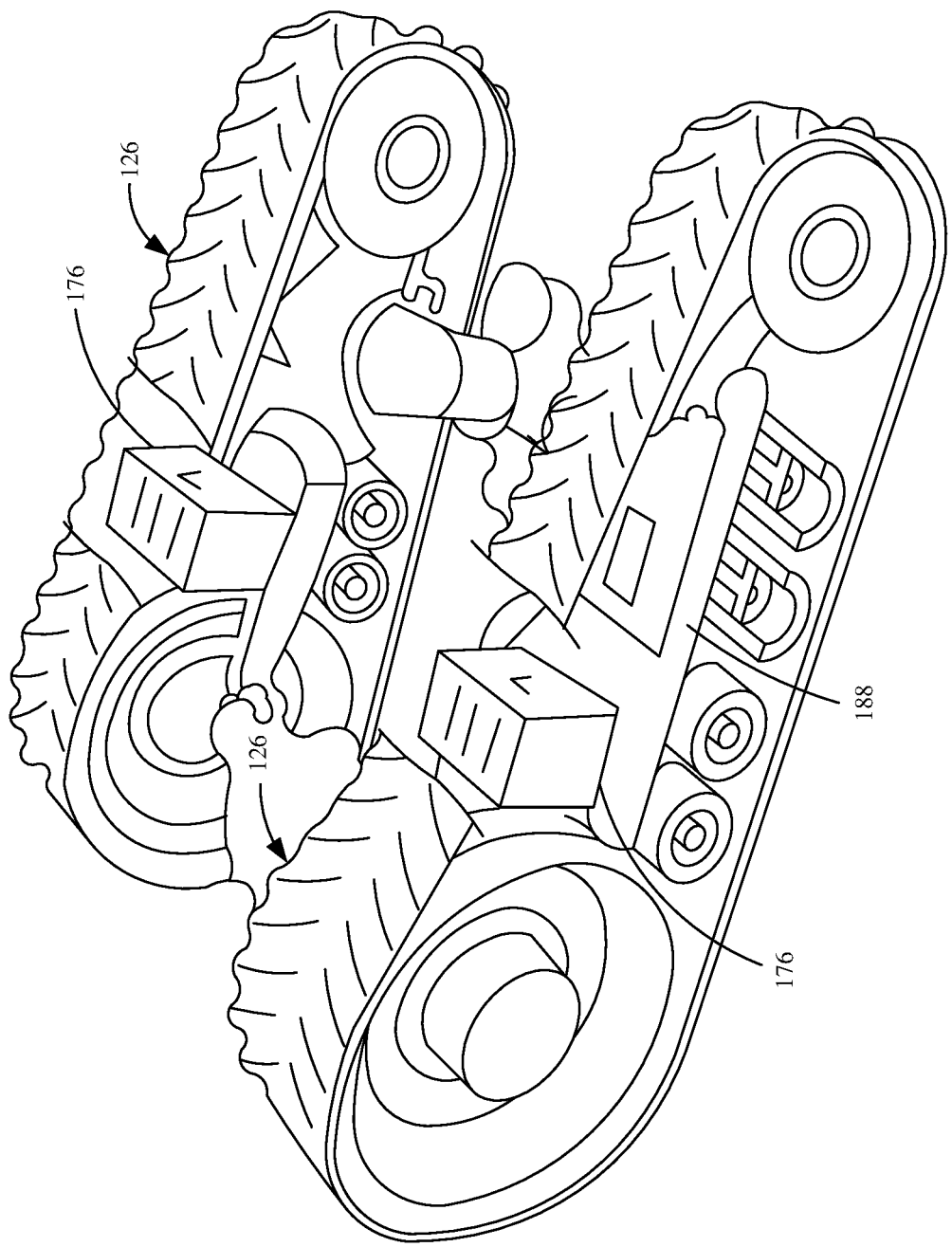
FIG. 7 is a partial pictorial, partial block diagram of a pair of tracks with sensor reading mechanisms affixed thereto.

In one example, replaceable sensors 144 are RFID sensors. Therefore, reading system 176 can include one or more different readers that are positioned relative to tracks 126-1 through 126-N so that the different RFID sensors can be read. FIG. 7, for instance, shows a pictorial illustration of one example of a set of reading systems 176. It can be seen in FIG. 7 that reading systems 176 are coupled to an undercarriage of the tractor 120, or they can be mounted on the structural portion 188 of each track subsystems. That is, the structural portion 188 can be used to support mid rollers 132-136. Therefore, the reading systems 176 can be coupled to that structural portion, or elsewhere. The reading systems 176 are illustratively positioned in close enough proximity to the tracks 126 that they can read sensors 144, either continually, or intermittently as the sensors 144 rotate past reading systems 176, when the tracks are rotating. One or more reading systems 176 thus read the signals from the replaceable sensors 144 and can provide an output, indicative of those signals, to signal processing system 178.

Data store 174 illustratively includes operating condition identification data 204 that can be used to identify operating conditions based on the sensor signals generated by sensors 144. For instance, certain operating conditions may be present when a characteristic crosses a threshold (e.g., when the track temperature output by sensor 144 crosses a temperature threshold), etc.

Data store 174 can also include track model 206. Track model 206 is illustratively a model of tracks 126-1 to 126-N. Therefore, based upon the sensor readings from sensors in a particular track, the model 206 can be accessed to identify how that particular track is behaving or is about to behave. By way of example, if one or more sensors 144 are pressure sensors, then it may be that the heat profile across the corresponding track will develop in a given way, based upon the pressure measurements. This may be modeled by track model 206. Therefore, once the pressure signal values are known, model 206 may be accessed to identify a temperature profile in the track. This is just one example.

Data store 174 can also include zone transfer function/correlation 208. Zone transfer function/correlation 208 is illustratively a transfer function or correlation that identifies a relationship between what is happening in a zone of the track 126 proximate sensor 144, to what is happening in other zones of the track, where no sensor is placed. For instance, if the sensors are temperature sensors and two adjacent temperature sensors provide sensor readings, the zone transfer function/correlation 208 illustratively identifies what the temperature profile is like in the track between those two sensors. This can be done for pressures, or other values as well.

Data store 174 can also include track characteristic data 210 and wear data 212 as well. Track characteristic data 210 may be sensed data that is sensed by sensors 144 or derived data that is derived from those sensor values (such as values derived by signal processing system 178) or other data. Wear data 212 is illustratively data indicative of the remaining lifetime of each track 126, or other wear characteristics corresponding to the track. Data store 174 can include a wide variety of other items 214 as well.

Signal processing system 178, in one example, illustratively includes track characteristic identifier 190, operating condition identifier 192, zone characteristic estimation system 194, wear tracking system 196, sensor problem detector 198, replacement detector 200, and it can include other items 202. In one example, the sensors 144 generate a signal indicative of a track characteristic of the track to which they are mounted. The track characteristic, as is described in greater detail elsewhere, can include such things as temperature, pressure, stress, strain, velocity, etc. Track characteristic identifier 190 illustratively generates characteristic values indicative of the track characteristic represented by each of the sensor signals that are read by reading system 176.

Operating condition identifier 192 identifies certain operating conditions that exist, or that are about to exist, based upon the characteristic values generated by track characteristic identifier 190. In one example, for instance, it may be that irreversible damage occurs in a track 126 when the track reaches a particular temperature threshold. In that case, operating condition identifier 192 can access operating condition identification data (e.g., thresholds) 204 from data store 174 and compare measured or estimated temperature values (where one or more sensors 144 is a temperature sensor or a sensor of a characteristic from which temperatures can be estimated) to the temperature threshold values that are indicative of an excessive wear condition. Operating condition identifier 192 can also identify operating conditions based on signal profiles, signal gradients, etc. For instance, assume that the sensors 144 are temperature sensors, and temperature gradients or temperature profiles is represented by the sensed temperature values. If the gradients or profiles correspond to a predetermined operating condition (again, such as a condition where excessive wear is about to occur on the track, etc.), then operating condition identifier 190 can access operating condition identification data 204 indicative of the profiles or gradients that correspond to that operating condition, and compare the sensed profile or gradients to those represented by the operating condition identification data to see if they match. If so, then the operating condition is present.

Operating condition identifier 192 illustratively generates an output indicative of the various operating conditions that have been identified.

Zone characteristic estimation system 194 illustratively estimates characteristics of the track in different zones, that do not necessarily correspond to an area where a sensor 144 is placed. For instance, system 194 may obtain temperature readings from two adjacent sensors 144, from track characteristic identifier 190. It may then access zone transfer function/correlation 208 in data store 174 to identify a correlation or transfer function indicative of the temperature of the track in an area between those two sensors, given the temperature readings from those two sensors. In this way, zone characteristic estimation system 194 can estimate the temperature profile, across multiple zones of the track, even though sensors are not located in all of those zones. In another example, it may be that sensors 144 are located in areas that are less exposed to the elements, or less exposed to wear. This may increase the lifetime of the sensors. In that case, zone characteristic estimation system 194 can estimate the characteristics of the track in other zones, that are more exposed to wear, without needing to have sensors at those locations. These are just examples of how zone characteristic estimation system 194 can be used.

Wear tracking system 196 illustratively generates wear data 212 corresponding to the various tracks 196 on which sensors 144 are disposed. The wear data can include information, such as the temperatures that the tracks 126 have reached, the pressures that they have reached, the amount of time at a particular pressure or temperature, the gradients or profiles of the sensed characteristics across the track, the number of revolutions of the track, etc. Some other wear data 212 is described elsewhere.

Sensor problem detector 198 illustratively detects when problems occur with any of the sensors 144. For instance, when the track vehicle is operating, but the sensor is not generating a signal, this may indicate that the sensor has been damaged or is inoperable for other reasons. It may be that the sensor is missing. Similarly, it may be that the sensor signal varies in a way that indicates an error with the sensor. Sensor problem detector 198 can detect various problems with sensors 144 based on these characteristics or in and other ways. The location of the problematic sensor can also be identified-such as an identity of the sensor receiving cavity it resides in, or in other ways.

Replacement detector 200 illustratively identifies when one or more of the sensors 144 have been replaced. By way of example, it may be that each sensor 144 has a unique identifier that it transmits along with its sensor data. When replacement detector 200 detects a new unique identifier, and detects the absence of an old unique identifier, it may identify that one or more of the sensors 144 have been replaced.

The information generated by signal processing system 178 can be provided to action signal generation system 182, it can be stored in data store 174, it can be output, using communication system 180, to remote systems 164, or it can be processed in other ways.

Action signal generation system 182 illustratively generates action signals based upon the sensor signals, the information generated by signal processing system 178, based on inputs by operator 168, or in other ways. Action signal generation system 182 thus includes alert signal generator 220, speed control signal generator 222, data store interaction component 224, communication control signal generator 226, and it can include other items 228. The action signal generation system 182 can generate action signals that are used to control one or more of the various controllable subsystems 184. In the example shown in FIG. 7, controllable subsystems 184 illustratively include propulsion subsystem 230, and it can include other items 232.

Alert signal generator 220 can generate an alert signal that is provided to operator interface mechanisms 170, so that operator 168 may be alerted. The alert signal can be a display signal, an audio signal, a haptic signal, a combination of these types of signals, etc.

Speed control signal generator 222 illustratively generates a speed control signal that is provided to control propulsion system 230 in order to control the speed of the track vehicle on which control system 162 is deployed. For instance, where one of the tracks 126 is overheating, then it may be that this is identified by operating condition identifier 192 and an indication of this is provided to speed control signal generator 222. In response, speed control signal generator 222 controls propulsion system 230 to reduce the speed of the track vehicle, or to reduce the speed of the track vehicle until the track cools down, or in other ways.

Data store interaction component 224 illustratively interacts with data store 174 to retrieve data from data store 174 and to store data on data store 174. For instance, when an alert signal is generated, or when a speed control signal, or another action signal is generated, data store interaction component 224 can store an indication of this on data store 174, so that it can be output and analyzed later.

Communication control signal generator 226 illustratively generates control signals to control communication system 180 to send information over network 166 to one or more remote systems 164. For instance, it can provide alert information, vendor information, maintenance information, wear data, or any of a wide variety of other information.

Figure 8:
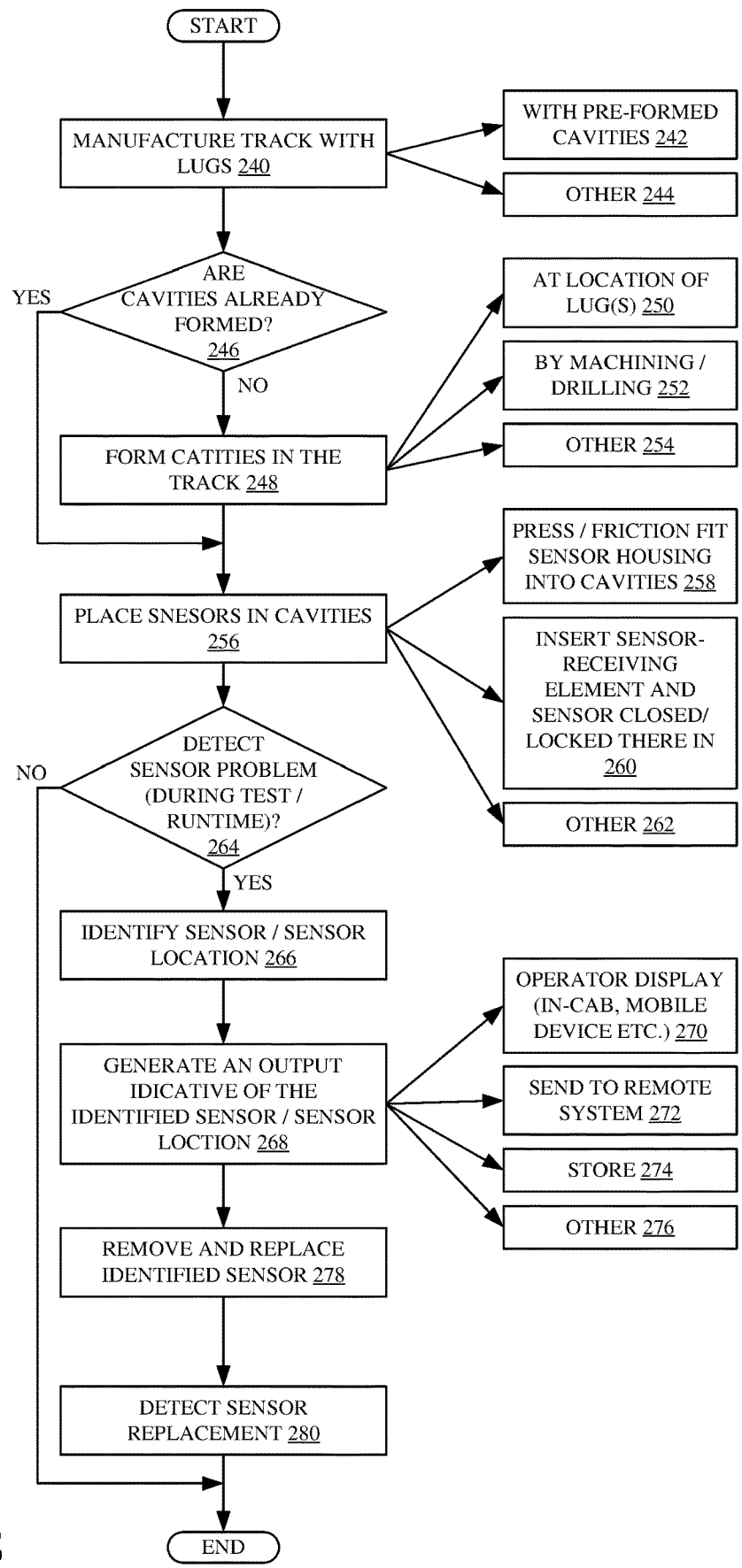
FIG. 8 is a flow diagram illustrating one example of how tracks can be formed with removable and replaceable sensors.

FIG. 8 is a flow diagram illustrating one way in which a track 126 is manufactured, and in which sensors 144 are placed on it. The present description will proceed with respect to track 126 being performed with lugs, but other tracks could be formed as well. it is first assumed that the track 126, itself, is manufactured, along with the lugs. This is indicated by block 240 in the flow diagram of FIG. 8. The track can be manufactured in a variety of known ways, and it may have the sensor-receiving cavities 142 formed therein, during manufacturing. This is indicated by block 242. The track and lugs, can be manufactured in other ways as well, and this is indicated by block 244.

If the sensor-receiving cavities 142 are not yet formed into the track, during its manufacturing, as indicated by block 246, then the cavities 142 are formed in the track. This is indicated by block 248. In one example, the cavities are formed generally at the location of the lugs 138. This is indicated by block 250. Also, in one example, the cavities are formed by machining or drilling operations. This is indicated by block 252. The cavities can be formed in the track 146 in other ways as well, and this is indicated by block 254.

Sensors 144 are then placed in the sensor-receiving cavities 142, as indicated by block 256. In one example, the sensors 144 have an outer housing that is press or friction fit into the cavities 142 in the track 126. This is indicated by block 258. In another example, the sensors 144 are inserted into a sensor-receiving element 146 that has been placed in the cavities 142. The sensors 144 can be press fit or frictionally fit into the sensor-receiving element 146, or the sensor-receiving element 146 can be closed or locked once the sensors 144 are inserted. This is indicated by block 260. The sensors 144 can be placed in the sensor-receiving cavities 144 in other ways as well, and this is indicated by block 262.

Once the sensors 144 are in place, and operating, it may be that sensor problem detector 198 (shown in FIG. 7) detects a sensor problem. This may be during a test, or at runtime. This is indicated by block 264. When that occurs, sensor problem detector 198 can identify the particular sensor 144, and its location on track 126 (e.g., the identity of the sensor-receiving cavity 142 it is located in). Identifying the sensor 144 and its location is indicated by block 266.

Sensor problem detector 198 then illustratively generates an output indicative of the identified sensor 144, the sensor location, and the problem that was detected. This is indicated by block 268. For instance, it can generate a signal that is provided to action signal generation system 182, where alert signal generator 220 controls operator interface mechanisms 170 to display an operator alert either in the cab of the track vehicle, on a mobile device carried by operator 168, or in other ways. This is indicated by block 270. Communication control signal generator 226 can receive the input from sensor problem detector 198 and control communication system 180 to send a message to a remote system 164, indicating that the sensor should be replaced. This is indicated by block 272. Data store interaction component 224 can store the sensor problem information in data store 174 for later access. This is indicated by block 274. Sensor problem detector 198 can generate other outputs that are processed in other ways as well. This is indicated by block 276.

At some point, the problematic sensor 144 is illustratively removed and replaced with a new sensor 144. Removing and replacing the identified sensor 144 is indicated by block 278 in the flow diagram of FIG. 8. Replacement detector 200 then detects that the defective sensor 144 has been replaced. This is indicated by block 280. Detector 200 can generate an output indicating this, and that output can be stored in data store 174, it can be provided to action signal generation system 182 for generation of an action signal, or it can be processed in other ways.

Figure 9:
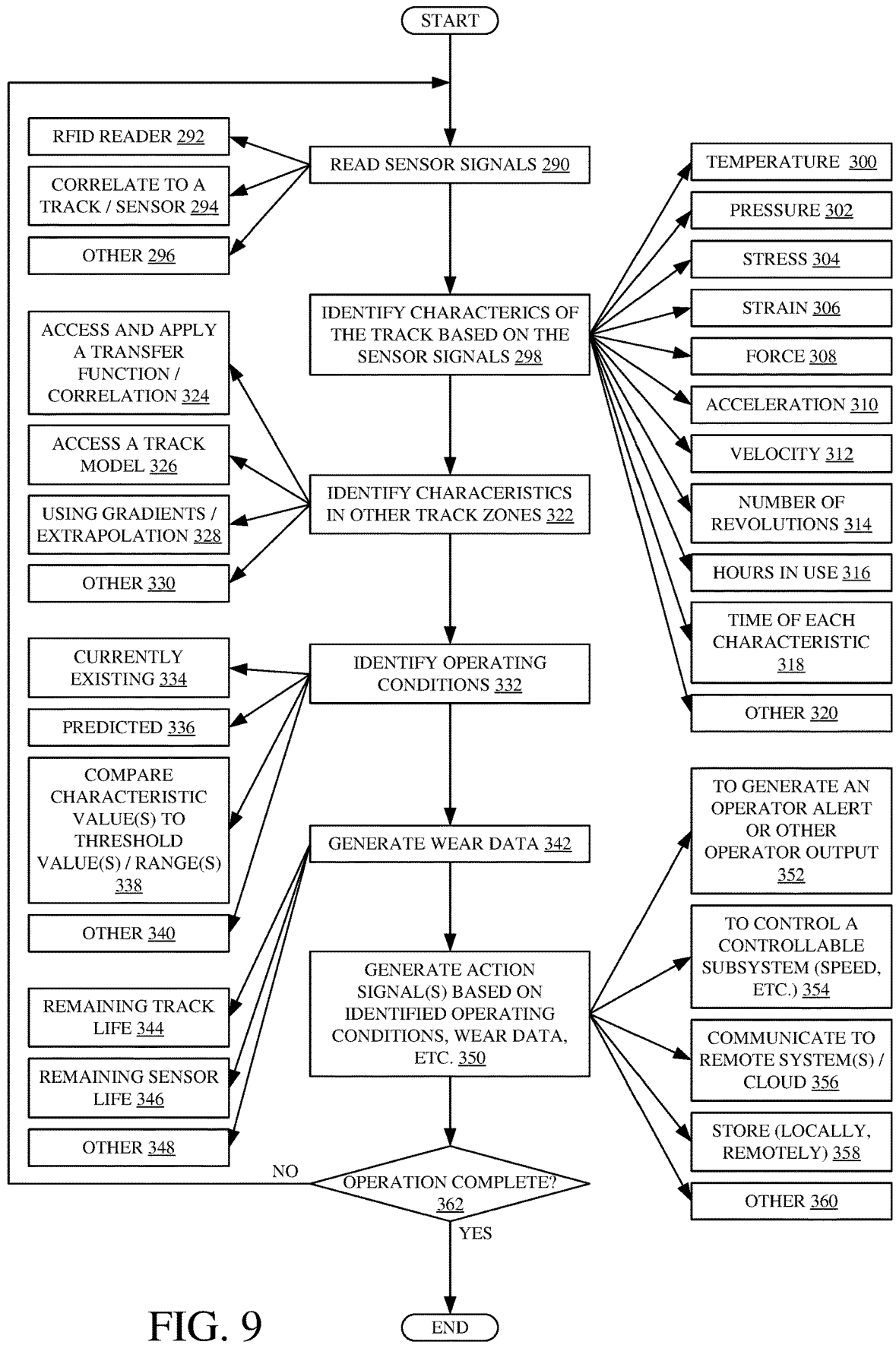
FIG. 9 is a flow diagram illustrating one example of the operation of the track vehicle control system shown in FIG. 6.

FIG. 9 is a flow diagram illustrating one example of the operation of track vehicle control system 162 in reading sensors 144 in a track 126. It will be noted that the sensors 144 in all of the tracks 126-1 through 126-N can be read and processed in a similar way, or in different ways. They can be read substantially simultaneously by a plurality of different reading systems 176, or they can be intermittently read, sequentially, or in another pattern, by one or more reading systems 176.

It is first assumed that reading system 176 reads the sensor signals from sensors 144. The present description will proceed with respect to reading sensors 144 from track 126-1. This is for the sake of example only. Reading the sensor signals from sensors 144 on track 126-1 is indicated by block 290 in the flow diagram of FIG. 9. The sensors 144 can be RFID sensors 292, or they can be a wide variety of other types of sensors. The sensor signals that are read by reading system 176 are illustratively correlated to a particular track 126-1 and a particular sensor 144 (or sensor location) on that track. This is indicated by block 294. The sensor signals can be read in other ways as well, and this is indicated by block 296.

The sensor signals are provided to signal processing system 178 where track characteristic identifier 190 identifies characteristics of the track 126-1 based upon the sensor signals from the sensors 144 mounted on that track. This is indicated by block 298. The characteristics that are identified by track characteristic identifier 190 can take a wide variety of different forms, and can be based upon the particular type of sensor or sensors 144 mounted on the track. The characteristics can include, for instance, temperature 300, pressure 302, stress 304, strain 306, force 308, acceleration 310, velocity 312, a number of revolutions of the corresponding track 126-1, as indicated by block 314, the number of hours that the track 126-1 has been in use, as indicated by block 316, the time of each characteristic (such as the time that track 126-1 was at a particular temperature, under a particular pressure, subjected to a particular stress or strain, etc.). The time of each characteristic is indicated by block 318. The characteristics that are identified can include a wide variety of other characteristics as well, and this is indicated by block 320.

Zone characteristic estimation system 194 then identifies characteristics in other track zones, where no sensor 144 is mounted. This is indicated by block 322. In doing so, it can access and apply the transfer function/correlation 208 in data store 174. This is indicated by block 324. It can access track model 206 to identify the characteristics in other track zones. This is indicated by block 326. It can identify characteristics in other track zones by using gradients and extrapolation, as indicated by block 328. It can identify the characteristics in other track zones using other mechanisms as well, and this is indicated by block 330.

Based upon the characteristics that are identified by the sensor signals, and those estimated by zone characteristic estimation system 194, operating condition identifier 192 illustratively identifies any operating conditions of interest with respect to track 126-1. This is indicated by block 332 in the flow diagram of FIG. 9. The operating conditions of interest may be those that currently exist in track 126-1, as indicated by block 334. They may be predicted operating conditions, which are about to happen. This is indicated by block 336. The operating conditions can be identified by comparing the characteristic values or the estimated values to operating condition identification data 204 (such as threshold values, ranges, etc.). Comparing the characteristic values to threshold values or ranges in order to identify operating conditions is indicated by block 338 in the flow diagram of FIG. 9. The operating conditions relative to track 126-1 can be identified in other ways as well. This is indicated by block 340.

Wear tracking system 196 also generates wear data 212 corresponding to the track 126-1. This is indicated by block 342. The wear data 212 can include a wide variety of different types of data, and it can be information that is derived from that data as well. For instance, wear tracking system 196 can track the useful life (or remaining track life) of track 126. This is indicated by block 344. It can also track the remaining sensor life for the various sensors 144 on track 126-1. This is indicated by block 346. It can identify other wear data, such as parts that need to be repaired, replaced, etc. This is indicated by block 348.

The sensor signals and any or all of the information generated by signal processing system 178 can also be provided to action signal generation system 182 which can generate one or more action signals based upon the operating conditions, the wear data, the characteristics, the characteristics in different zones, etc. Generating an action signal based on these items is indicated by block 350 in the flow diagram of FIG. 9.

The action signal can take a wide variety of different forms. For instance, alert signal generator 220 can generate an operator alert or other operator output on operator interface mechanisms 170 for operator 168. This is indicated by block 352 in the flow diagram of FIG. 9. The action signal generation system 183 can generate a control signal that is output to control one or more of controllable subsystems 184 (such as the propulsion system 230). This is indicated by block 354. Communication control signal generator 226 can generate a communication system control signal that is used to control communication system 180 to communicate with remote systems 164. It can send information to remote systems 164, receive information from remote systems 164, etc. Communication with remote systems 164 can also include communicating with systems in a remote server environment (such as the cloud). Communicating to remote systems or the cloud is indicated by block 356 in the flow diagram of FIG. 9. Data store interaction component 224 can generate control signals to store data on data store 174. It can also generate control signals to send data to a remote storage system, such as cloud-based storage system, for storage there as well. Generating control signals to store the data either locally or remotely is indicated by block 358 in the flow diagram of FIG. 9. Action signal generation system 182 can generate a wide variety of other action signals as well. This is indicated by block 360. If the current operation of the track vehicle is not yet complete, the processing reverts to block 290. This is indicated by block 362 in the flow diagram of FIG. 9.

It can thus be seen that removable and replaceable sensors 144 are placed in sensor receiving cavities 142 in tracks that are used on a track vehicle. Sensor signals can be read from those sensors and processed in a wide variety of different ways. Defective sensors can be replaced quickly and easily, thus improving the tracks. If a sensor is defective, the sensor can be replaced, without replacing the entire track.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

A number of data stores have also been discussed. It will be noted they can each be broken into multiple data stores.

All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
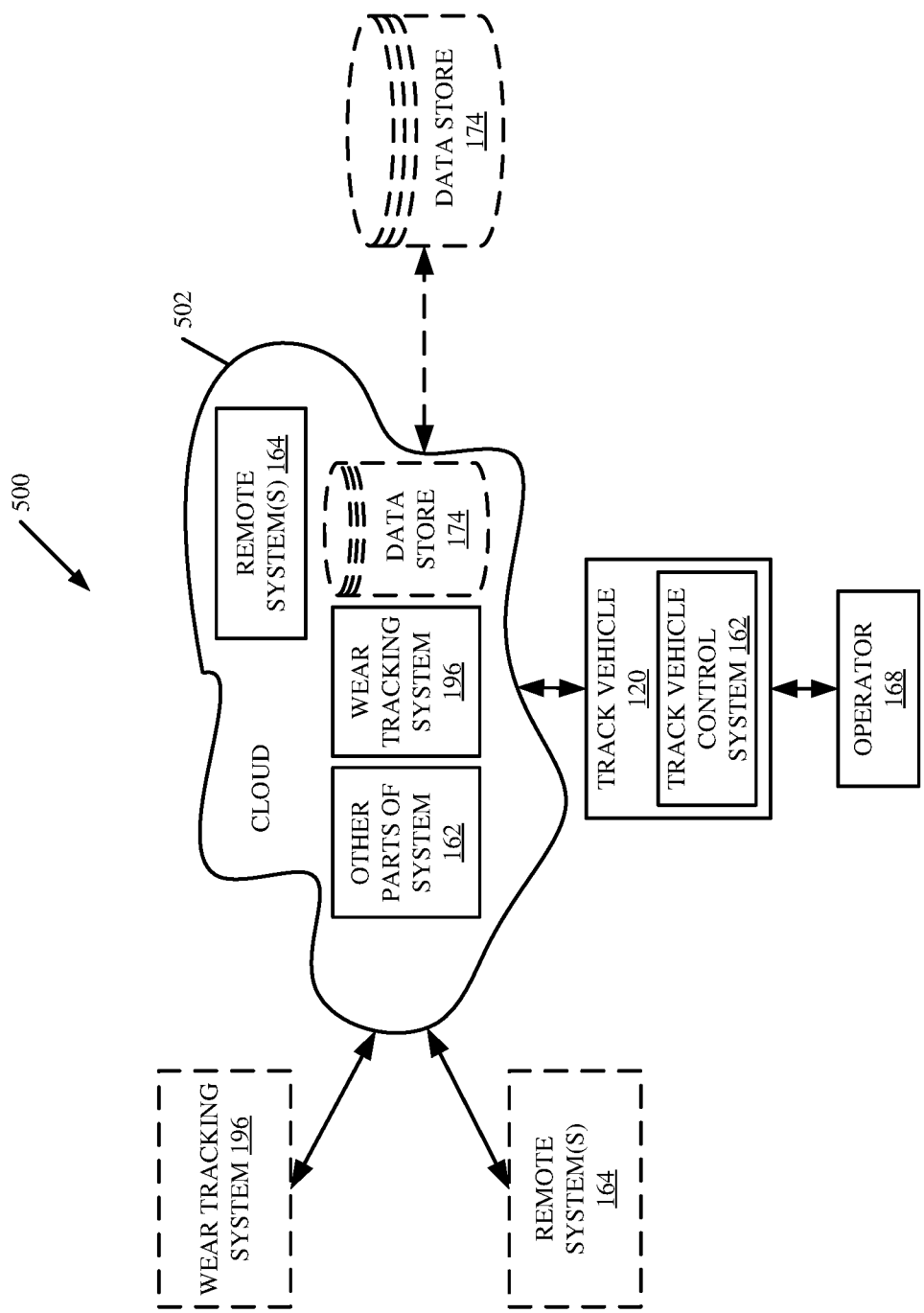
FIG. 10 is a block diagram showing one example of the track vehicle control system illustrated in FIGS. 1B and 2, deployed in a remote server environment.

FIG. 10 is a block diagram of a track vehicle 120, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous figures as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in FIGS. 1B and 2 and they are similarly numbered. FIG. 10 specifically shows that some items of control system 162 can be located at a remote server location 502. Therefore, vehicle 120 accesses those systems through remote server location 502.

FIG. 10 also depicts another example of a remote server architecture. FIG. 10 shows that it is also contemplated that some elements of FIG. 2 are disposed at remote server location 502 while others are not. By way of example, r data store 174 or remote system(s) 164 can be disposed at a location separate from location 502, and accessed through the remote server at location 502. Regardless of where they are located, they can be accessed directly by vehicle 120, through a network (either a wide area network or a local area network), they can be hosted at a remote site by a service, or they can be provided as a service, or accessed by a connection service that resides in a remote location All of these architectures are contemplated herein.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
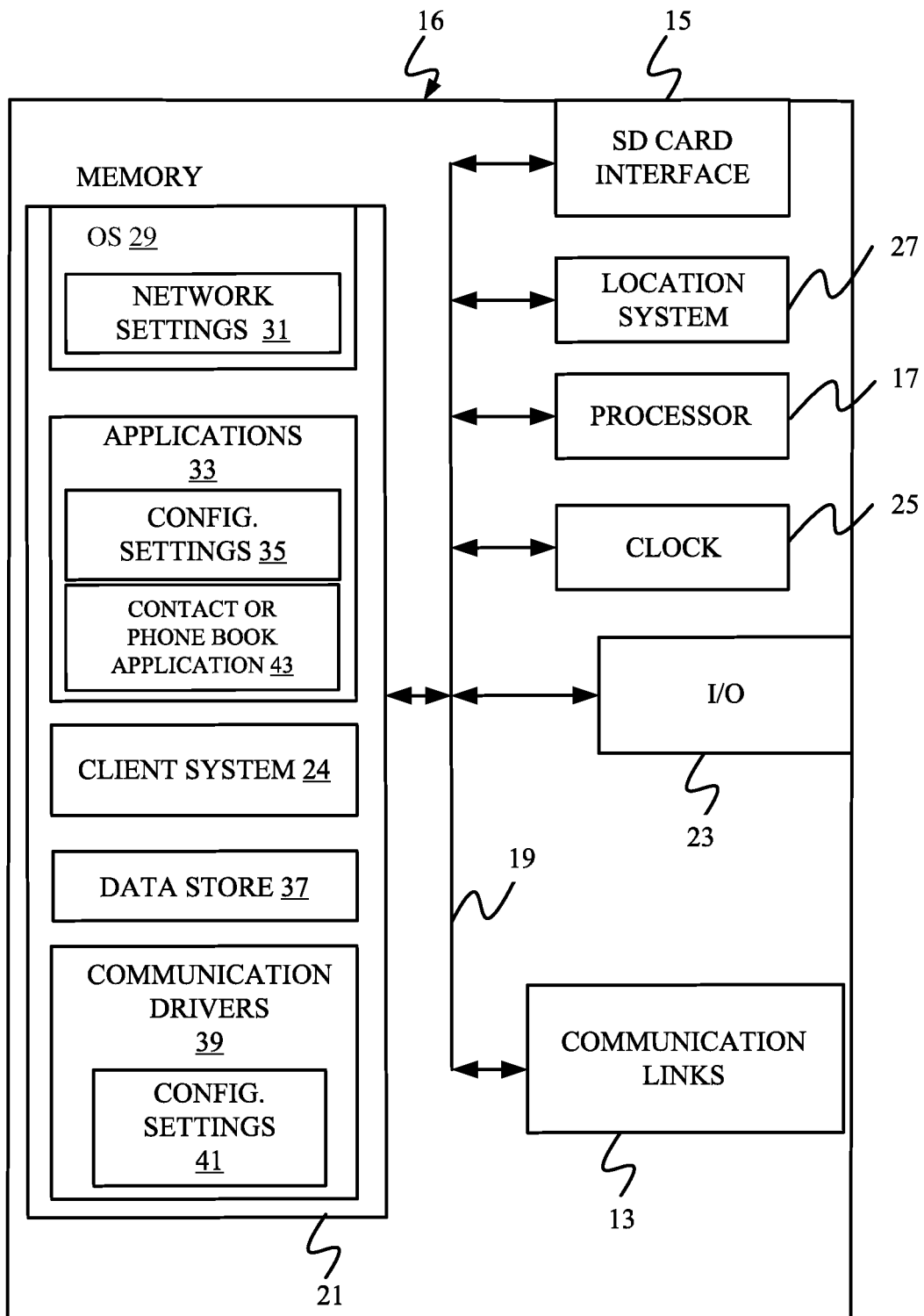
FIGS. 11-13 show examples of mobile devices that can be used as operator interface mechanisms in the architectures shown in previous FIGS.
Figure 12:
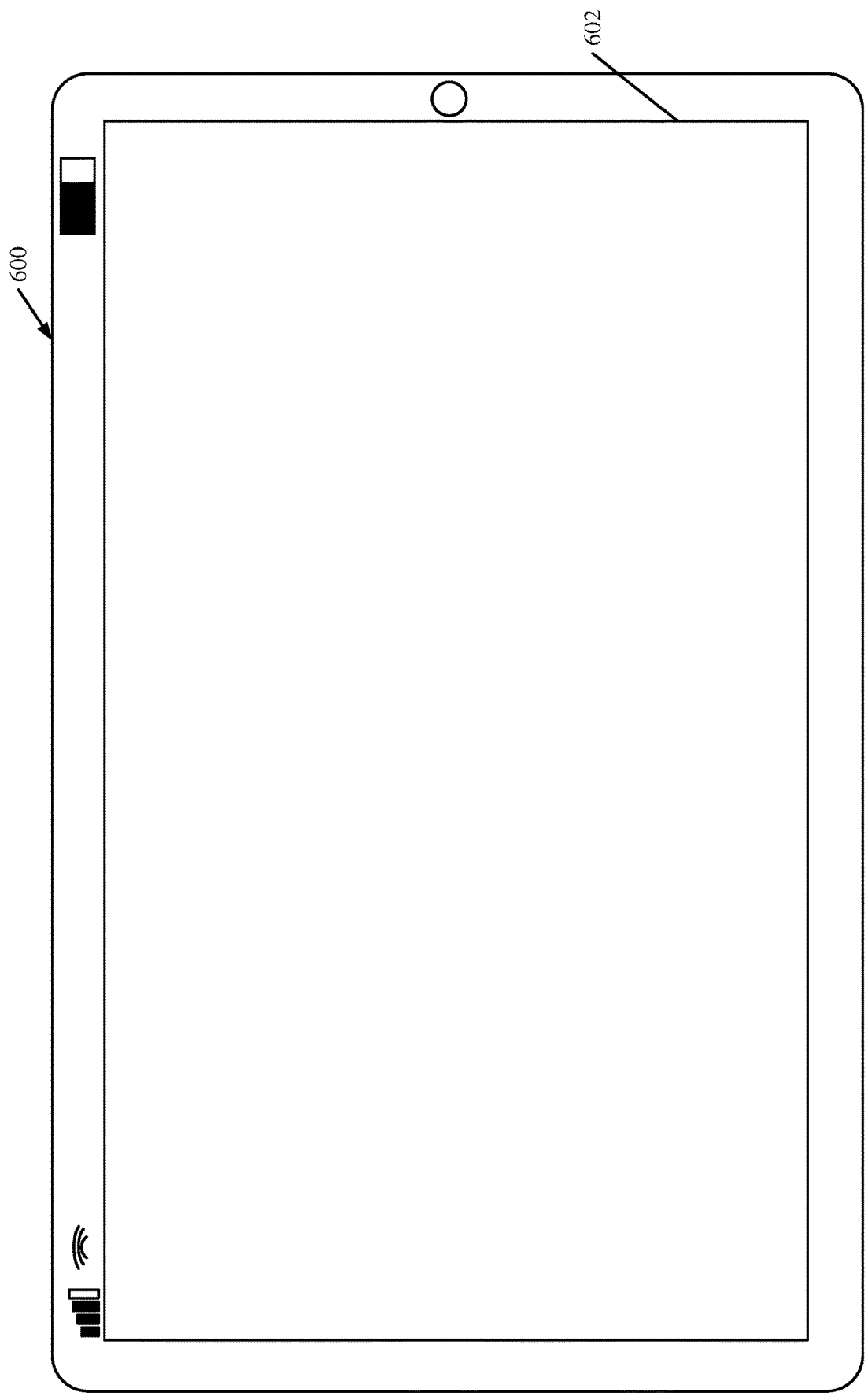
Figure 13:
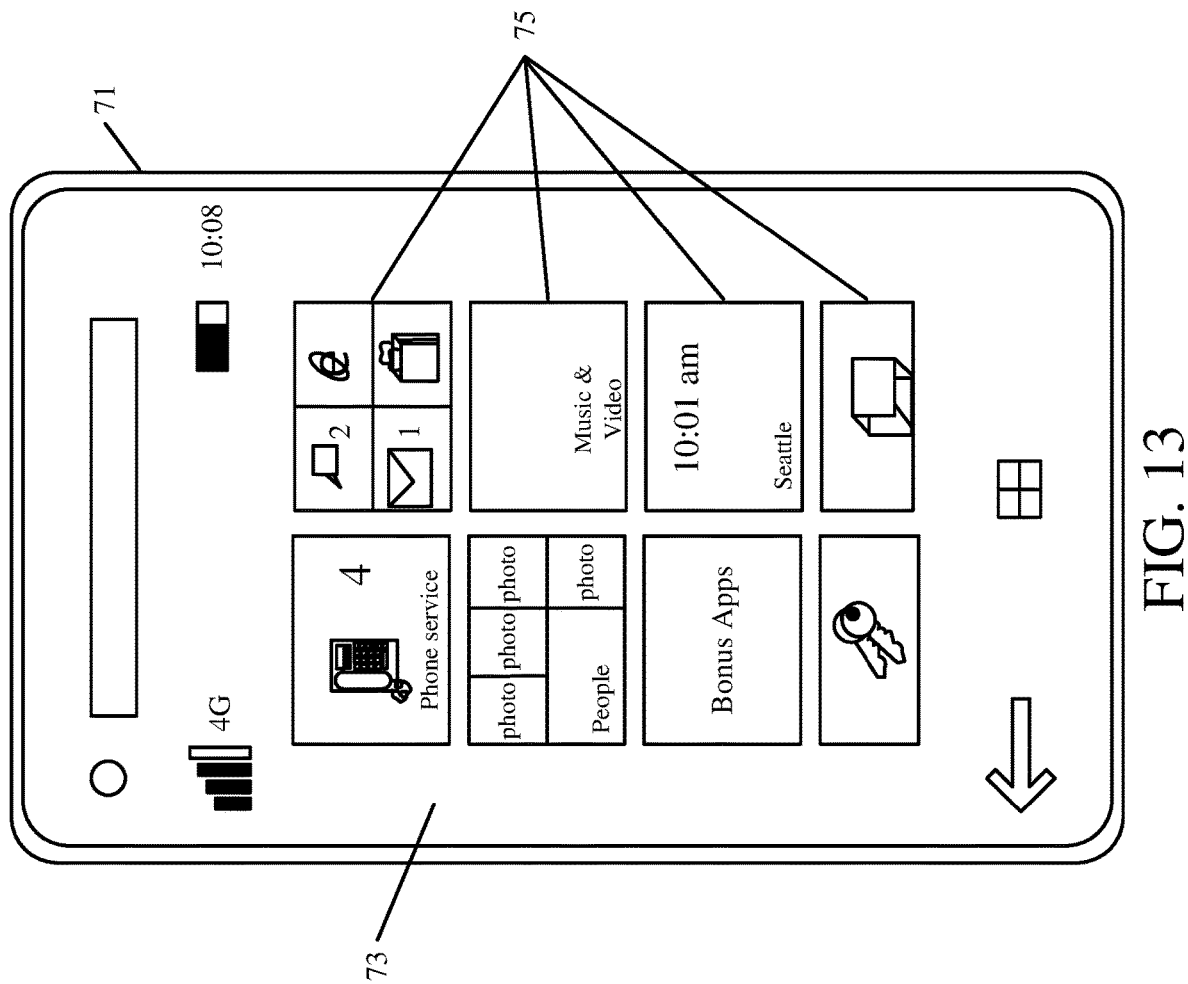

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of vehicle 120 for use in receiving, processing, or displaying the sensor data. FIGS. 12-13 are examples of handheld or mobile devices.

FIG. 11 provides a general block diagram of the components of a client device 16 that can run some components shown in FIG. 2, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, contact or phone book application 43, client system 24, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 is a tablet computer 600. In FIG. 12, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
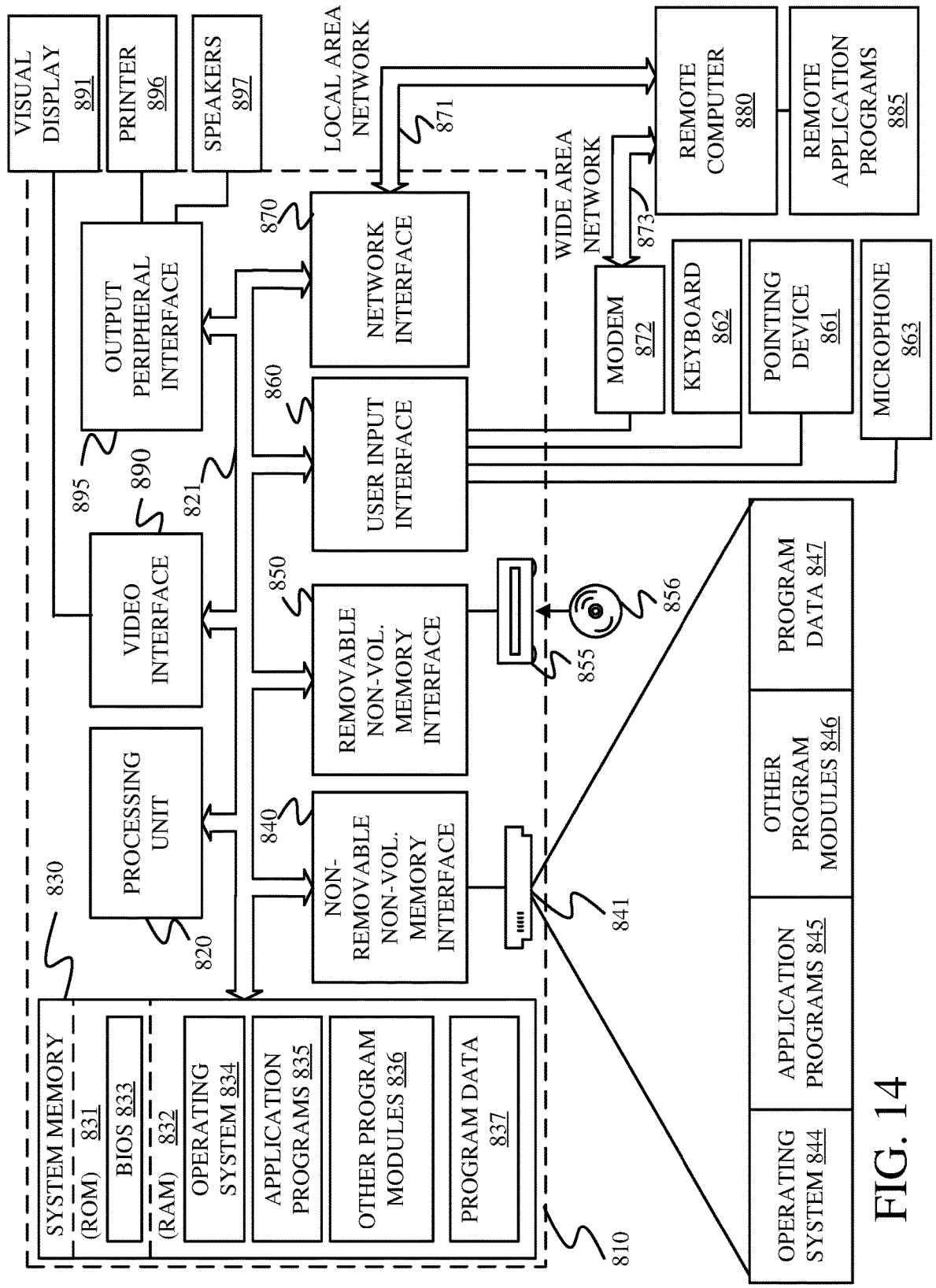
FIG. 14 is a block diagram showing one example of a computing environment that can be used in the architectures shown in previous figures.

FIG. 14 is one embodiment of a computing environment in which elements of FIG. 1, or parts of it, (for example) can be deployed. With reference to FIG. 14, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a track for mounting on a track vehicle, the track comprising:

a continuous belt having a sensor receiving cavity disposed therein, the sensor receiving cavity being sized to removably receive a track characteristic sensor; and an inner surface feature shaped to engage a corresponding feature on a drive roller, of a track vehicle, to be driven by the drive roller to propel the track vehicle over a surface.

Example 2 is the track of any or all previous examples wherein the continuous belt is molded and wherein the sensor receiving cavity comprises a molded cavity that is molded into the track during molding of the track.

Example 3 is the track of any or all previous examples wherein the sensor receiving cavity is formed in the track after the belt is molded.

Example 4 is the track of any or all previous examples and further comprising:

a cavity closure configured to close the sensor receiving cavity, so the sensor is captured within the sensor receiving cavity by the closure, the closure being openable to replace the sensor.

Example 5 is the track of any or all previous examples and further comprising:

a sensor receiving element disposed within the sensor receiving cavity and defining a structural housing with an opening sized to receive the sensor.

Example 6 is the track of any or all previous examples and further comprising:

a closure configured to close the opening in the structural housing, so the sensor is captured within the structural housing, the closure being openable to replace the sensor.

Example 7 is the track of any or all previous examples and further comprising:

a plurality of lugs disposed on an exterior surface of the continuous belt and wherein the sensor receiving cavity is formed in one of the plurality of lugs.

Example 8 is the track of any or all previous examples and further comprising:

a track characteristic sensor disposed within the sensor receiving cavity.

Example 9 is the track of any or all previous examples wherein the sensor receiving cavity has an inner periphery sized to frictionally retain an exterior surface of a housing of the track characteristic sensor during operation of the track vehicle.

Example 10 is the track of any or all previous examples wherein the continuous belt is formed of rubber.

Example 11 is a track assembly for mounting on a track vehicle, comprising:

a track characteristic sensor;

a continuous belt having a sensor receiving cavity disposed therein, the sensor receiving cavity being sized to receive the track characteristic sensor, the track characteristic sensor being replaceably held within the sensor receiving cavity; and an inner surface feature shaped to engage a corresponding feature on a drive roller, of a track vehicle, to be driven by the drive roller to propel the track vehicle over a surface.

Example 12 is the track assembly of any or all previous examples wherein the sensor comprises:

a radio frequency identification (RFID) sensor.

Example 13 is the track assembly of any or all previous examples and wherein the sensor receiving cavity has an opening sized to receive the track characteristic sensor and further comprising:

a closure configured to close the opening in the sensor receiving cavity to retain the sensor therein during movement of the track vehicle.

Example 14 is the track assembly of any or all previous examples wherein the closure is configured to be openable to replace the track characteristic sensor.

Example 15 is the track assembly of any or all previous examples and further comprising:

a structural sensor receiving element disposed within the sensor receiving cavity and having an inner periphery sized to receive the track characteristic sensor therein.

Example 16 is a method of forming a track assembly for a track vehicle, the method comprising:

forming a continuous belt;

forming a sensor receiving cavity in the continuous belt;

inserting a track characteristic sensor in the sensor receiving cavity so the track characteristic sensor is replaceable.

Example 17 is the method of any or all previous examples wherein forming the continuous belt comprises molding the continuous belt and wherein forming the sensor receiving cavity comprises:

forming the sensor receiving cavity in the continuous belt during molding of the continuous belt.

Example 18 is the method of any or all previous examples wherein forming the continuous belt comprises molding the continuous belt and wherein forming the sensor receiving cavity comprises:

forming the sensor receiving cavity on the continuous belt after the continuous belt is molded.

Example 19 is the method of any or all previous examples and further comprising:

after inserting the track characteristic sensor in the sensor receiving cavity, closing the sensor receiving cavity with a closure that is configured to be opened during replacement of the track characteristic sensor.

Example 20 is the method of any or all previous examples and further comprising:

detecting a sensor problem with the track characteristic sensor;

opening the closure;

replacing the track characteristic sensor with a different track characteristic sensor; and closing the sensor receiving cavity with the closure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A track for mounting (in a track vehicle, the track comprising:

a continuous belt having a sensor receiving cavity formed therein, the sensor receiving cavity defining a void configured to removably receive a track characteristic sensor and having an inner periphery that is sized to contact an exterior surface of a housing of the track characteristic sensor, wherein the sensor receiving cavity is formed in the continuous belt during molding of the continuous belt; and an inner surface feature shaped to engage a corresponding feature on a drive roller, of a track vehicle, to be driven by the drive roller to propel the track vehicle over a surface.

2. The track of claim 1, wherein the sensor is a radio frequency identification (RFID) sensor.

3. The track of claim 2, wherein the RFID sensor is configured to generate and transmit a sensor signal, indicative of a track characteristic, to an RFID reader when the RFID sensor is brought to a given position relative to the RFID reader.

4. The track of claim 1 and further comprising:

a plurality of lugs disposed on an exterior surface of the continuous belt and wherein the sensor receiving cavity is formed in one of the plurality of lugs.

5. The track of claim 1, wherein the continuous belt is formed of rubber.

6. A track assembly for mounting on a track vehicle, comprising:
- a track comprising a continuous belt;
- a sensor receiving cavity formed in the continuous belt during molding of the continuous belt, the sensor receiving cavity defining a void;
- a sensor receiving element disposed within the sensor receiving cavity and configured to removably receive a track characteristic sensor while being disposed within the receiving cavity; and
- an inner surface feature shaped to engage a corresponding feature on a drive roller, of a track vehicle, to be driven by the drive roller to propel the track vehicle over a surface.

7. The track assembly of claim 6, wherein the sensor receiving element has an inner periphery that is sized to contact an exterior surface of the track characteristic sensor.

8. The track assembly of claim 6, wherein the sensor receiving cavity has an inner periphery that is sized to contact an exterior surface of the sensor receiving element.

9. The track assembly of claim 6 and further comprising:
- a closure element configured to cover the opening and to be openable to uncover the opening.

10. The track assembly of claim 9, wherein the sensor receiving element further comprises a flange, wherein the closure element comprises a flange, and wherein the flange of the closure element is configured to be secured to the flange of the sensor receiving element.

* * * * *

UNITED STATES PATENT AND TRADEMARK OFFICE
CERTIFICATE OF CORRECTION

PATENT NO. : 11,707,983 B2
APPLICATION NO. : 16/776771
DATED : July 25, 2023
INVENTOR(S) : Martin Kremmer and Carroll C. Kellum It is certified that error appears in the above-identified patent and that said Letters Patent is hereby corrected as shown below:

In the Claims

Claim 1 (Line 1): Please replace the error '(in' with the correction: 'on'.

Signed and Sealed this
Second Day of September, 2025

Coke Morgan Stewart
*Acting Director of the United States Patent and Trademark Office*